United States Patent
US 11,651,262 B2
Marinescu et al.
(45) Date of Patent: May 16, 2023

(54) INTERACTIVE DIAGNOSTICS OF CONNECTED APPLIANCE DEVICES

(71) Applicant: International Business Machines Corporation, Armonk, NY (US)

(72) Inventors: Radu Marinescu, Dublin (IE); Akihiro Kishimoto, Castleknock (IE)

(73) Assignee: International Business Machines Corporation, Armonk, NY (US)

( * ) Notice: Subject to any disclaimer, the term of this patent is extended or adjusted under 35 U.S.C. 154(b) by 339 days.

(21) Appl. No.: 17/028,129

(22) Filed: Sep. 22, 2020

(65) Prior Publication Data

US 2022/0093279 A1 Mar. 24, 2022

(51) Int. Cl.
*G06N 20/00* (2019.01)
*G16Y 40/10* (2020.01)
*G16Y 40/35* (2020.01)
*G16Y 40/20* (2020.01)
*G06N 7/01* (2023.01)

(52) U.S. Cl.
CPC ............ *G06N 7/01* (2023.01); *G06N 20/00* (2019.01); *G16Y 40/10* (2020.01); *G16Y 40/20* (2020.01); *G16Y 40/35* (2020.01)

(58) Field of Classification Search
CPC .......... G06N 7/005; G06N 20/00; G06N 3/04; G06N 5/02; G16Y 40/10; G16Y 40/20; G16Y 40/35
See application file for complete search history.

(56) References Cited

U.S. PATENT DOCUMENTS

| 4,977,394 | A | 12/1990 | Manson | |
|---|---|---|---|---|
| 9,383,746 | B2 | 7/2016 | Ha | |
| 10,554,438 | B2 * | 2/2020 | Wang | H04L 12/2823 |
| 2012/0316984 | A1 | 12/2012 | Glassman | |
| 2017/0169342 | A1 | 6/2017 | Waltinger | |
| 2018/0121808 | A1 | 5/2018 | Ramakrishna | |
| 2019/0158309 | A1 | 5/2019 | Park | |
| 2020/0012954 | A1 | 1/2020 | Botea | |
| 2020/0019893 | A1 | 1/2020 | Lu | |

FOREIGN PATENT DOCUMENTS

EP 2683126 A2 1/2014

OTHER PUBLICATIONS

Cai, Baoping, Lei Huang, and Min Xie. "Bayesian networks in fault diagnosis." IEEE Transactions on industrial informatics 13.5 (2017): 2227-2240. (Year: 2017).*

* cited by examiner

*Primary Examiner* — Soe Hlaing
(74) *Attorney, Agent, or Firm* — Aaron Pontikos

(57) ABSTRACT

A historical log of a plurality of a type of Internet-connected appliances is collected. a dynamic probabilistic graphical model of the time-lined interactions between subsystems and components of the appliances is generated. The probabilistic graphical model is trained by applying machine learning techniques and applying expert knowledge. A natural language processing (NLP) conversational user interface for diagnostic queries regarding operational errors is provided, and responsive to receive a diagnostic query in a conversational format from a user regarding a particular type, make, and model of an appliance of the plurality of the type of Internet-connected appliances, a diagnostic response is provided to the user interface using the natural language processing conversational format.

20 Claims, 5 Drawing Sheets

INTERACTIVE DIAGNOSTICS OF CONNECTED APPLIANCE DEVICES

FIELD OF THE INVENTION

The present invention relates generally to the field of equipment diagnostics and more particularly to a probabilistic graphical diagnostic system of Internet-connected appliances.

BACKGROUND OF THE INVENTION

Household and industrial appliances, and some technology-based devices are often purchased with an expectation of a relatively problem-free and long life. Because many appliance devices are large, heavy, and may involve installation connections, service and repair of appliance issues often involves on-site visits by trained and experienced service personnel. Appliances often include sensors that monitor operational conditions of components and subsystems of the appliance. In some cases, appliances and technology-based devices include connections to a network and are considered as Internet of Things (IoT) devices.

Probabilistic graphical models (PGMs) include conditional dependencies of random variables reflected in the structure of the graph, and often reflect Bayesian statistical relationships and can be based on machine learning techniques.

SUMMARY

Embodiments of the present invention disclose a method, computer program product, and system. The embodiments include a method for automated diagnosis of appliances, the method providing for one or more processors to collect a historical log of operational activity of a plurality of a type (class) of Internet-connected appliances; wherein the type includes all makes and models of appliances performing a same fundamental operation. The one or more processors extract from the historical log of operational activity, instances associated with changes to the operational activity of the type of Internet-connected appliances, wherein the instances include a timeline of operational activity and sensor data associated with respective appliance instances. The one or more processors to generate a dynamic probabilistic graphical model of the Internet-connected appliances that includes interaction between the one or more subsystems and components of the appliances through the timeline of operational activity. The one or more processors train the dynamic probabilistic graphical model by applying machine learning techniques to the collection of the historical log of operational activity of the plurality of the type of Internet-connected appliances. The one or more processors apply expert knowledge of the interaction between the one or more subsystems and components of the respective appliances as supervised learning of machine learning techniques. The one or more processors provide a natural language processing (NLP) conversational user interface for diagnostic queries regarding an operational error, and the one or more processors, responsive to receive a diagnostic query in a conversational format from a user regarding a particular type, make, and model of an appliance of the plurality of the type of Internet-connected appliances, providing a diagnostic response to the user interface using the natural language processing conversational format.

DETAILED DESCRIPTION

Figure 1:
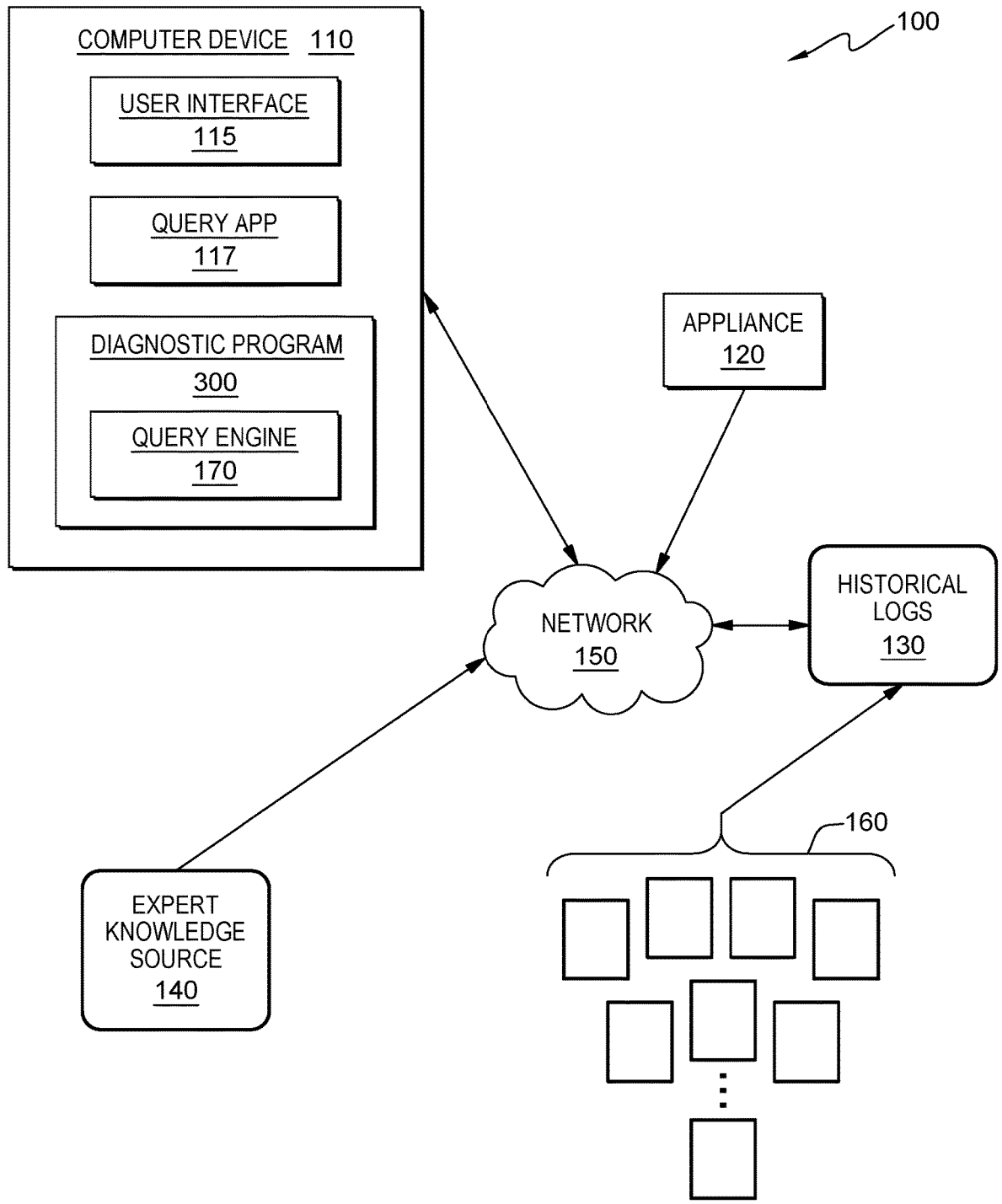
FIG. 1 is a functional block diagram illustrating a distributed data processing environment, in accordance with an embodiment of the present invention.

Embodiments of the present invention recognize that diagnosis of a malfunctioning appliance is currently a manual process with a heavy dependency on personal knowledge and experience of the attending service technician. In some situations, results of the manual diagnosis may require an interruption of service to acquire unforeseen parts, or additional consultation, extending the duration of appliance downtime.

Embodiments of the present invention also recognize that newer domestic and industrial appliances as well as technology-based devices are enabled with connectivity to a network, such as connection to the Internet, typically via Wi-Fi. Connectivity enables data collection and communication as a function of a timeline, and aggregation of the collected data, associated with symptomatic characteristics and malfunction can be used to generate and train a model for diagnostic and interactive servicing of appliances. In some embodiments of the present invention, sensors included in the appliance or device can detect operational conditions as a function of time and transmit the data from the network-connected appliance to a collection repository.

Embodiments recognize that technician experience is acquired over years of performing service, and appliance models, features, and functions continuously change, working as oppose to an experience-based service model. Embodiments of the present invention further recognize that appliance servicing is drastically improved by providing data-supported diagnosis information available by an interactive query.

Embodiments of the present invention provide a method, computer program product, and computer system for generating a probabilistic graphical model of an appliance, capturing the interaction and interdependence of subsystems and components of the appliance across a timeline. The probabilistic graphical model structurally defined the dependencies of random variables associated with the appliance operation that may lead to symptom observations, error codes, and malfunction. The probabilistic graphical model is developed from aggregating operational logs of sensor data and appliance events from multiple appliances of the same class or type, such as a washing machine, and training the model based on the collected sensor data and input from expert knowledge sources, such as technical manuals and experienced service technicians. In some embodiments, the aggregated sensor data and appliance events are further refined for a particular manufacturer of an appliance type.

In some embodiments of the present invention, the probabilistic graphical model includes a natural language interactive query function in which the graphical model includes nodes associated with symptoms, error codes, and malfunctions and corresponding sensor data. The probabilistic graphical model receives a proper conditional probability query from a query engine enabling recognition of query subjects and provision of data-supported text and/or audio responses to natural language queries.

The present invention will now be described in detail with reference to the Figures. FIG. 1 is a functional block diagram illustrating a distributed data processing environment, generally designated 100, in accordance with an embodiment of the present invention. FIG. 1 provides only an illustration of one implementation and does not imply any limitations concerning the environments in which different embodiments may be implemented. Many modifications to the depicted environment may be made by those skilled in the art without departing from the scope of the invention as recited by the claims.

Distributed data processing environment 100 includes computing device 110, appliance 120, historical logs 130, expert knowledge source 140, multiple appliances 160, and query engine 170, all interconnected via network 150. Network 150 can be, for example, a local area network (LAN), a wide area network (WAN), such as the Internet, a virtual local area network (VLAN), or any combination that can include wired, wireless, or optical connections. In general, network 150 can be any combination of connections and protocols that will support communications between computing device 110, appliance 120, historical logs 130, expert knowledge source 140, multiple appliances 160, and query engine 170, in accordance with embodiments of the present invention.

Computing device 110 includes user interface 115, query application (app) 117, and diagnostic program 300. Computing device 110 performs the operational functions and logistics enabling query app 117 and diagnostic program 300. In some embodiments, computing device 110 may be a server computer, a laptop computer, a tablet computer, a smartphone, smartwatch, a wearable computing device, or any programmable electronic mobile device capable of communicating with various components and devices within distributed data processing environment 100, via network 150. In another embodiment, computing device 110 represents a computing system utilizing clustered computers and components (e.g., database server computers, application server computers, etc.) that act as a single pool of seamless resources when accessed within distributed data processing environment 100. In general, computing device 110 represents one or more programmable electronic devices or a combination of programmable electronic devices capable of executing machine-readable program instructions and communicating with other entities and data sources of distributed data processing environment 100, via network 150. Computing device 110 may include internal and external hardware components, depicted in more detail in FIG. 5.

User interface 115 provides an interface to access the features and functions of computing device 110. In some embodiments of the present invention, user interface 115 provides access to query app 117 and administrator and training access to diagnostic program 300, and may also support access to other applications, features, and functions of computing device 110 (not shown). In some embodiments, user interface 115 provides display output and input functions for computing device 110.

User interface 115 supports access to alerts, notifications, and provides access to forms of communications. In one embodiment, user interface 115 may be a graphical user interface (GUI) or web user interface (WUI) and can receive user input and display text, documents, web browser windows, user options, application interfaces, and instructions for operation, and include the information (such as graphic, text, and sound) that a program presents to a user and the control sequences the user employs to control the program. In another embodiment, user interface 115 may also include mobile application software that provides respective interfaces to features and functions of computing device 110. User interface 115 enables respective users of computing device 110 to receive, view, hear, and respond to input, access applications, display content of online conversational exchanges, and perform available functions.

Query app 117 is depicted as operating on computing device 110 and interfaces with diagnostic program 300. In some embodiments, query app 117 may operate from a computing device separate from, but communicatively connected to computing device 110. Query app 117 is an interactive program enabling a user to access the probabilistic graphical model generated and supported by diagnostic program 300 and submit queries regarding the status and performance of appliance 120. In some embodiments, query app 117 receives queries in a natural language format, processes the received queries and provides a natural language response to the query, enabled by query engine 170 and the diagnostic model of diagnostic program 300. In some embodiments, query app 117 receives and provides natural language communication in a format of a text-based message, such as a short message service (SMS) text, or other digitized text-based communication. In other embodiments, query app 117 receives audio input of natural language queries and, with appropriate configuration (i.e., speaker, not shown) provides audio responses to the received query.

Diagnostic program 300 includes a component to generate a probabilistic graphical model by machine learning, based on data received from historical logs 130 and expert knowledge sources 160. The probabilistic graphical model expresses the conditional dependence structure between random variables in a graphical format. Diagnostic program 300 also includes a component, query engine 170, that interacts with query app 117 to receive query information formatted to align with nodes and interdependencies formed in the probabilistic graphical model. Diagnostic program 300 provides a corresponding response to received queries regarding a particular appliance, such as appliance 120.

In some embodiments, diagnostic program 300 generates one or more probabilistic graphs modeling the relationships and interdependencies between physical components, operational modes, defined variables, sensor information, and error codes and messages of a plurality of appliances. Diagnostic program 300 performs unsupervised and supervised machine learning techniques to determine relationships and dependencies and includes the relationships and dependencies in graphical representation.

For example, a collection of log records (L) of a plurality of appliances includes sensor readings of operational activity and corresponding date and time (time horizon, H) of respective readings from the appliances. In some embodiments, a collection of variables (V) associated with sensors, components, and operation of the appliances is included in the log files of the appliances, such that each variable (Vi) corresponds to a column in the log records (L) and each time horizon entry may be represented as a row in the log records (L). The data from L, H, and V is applied to a structure learning algorithm that results in learning the structure of a dynamic Bayesian network (DBN) model. Parameters of the DBN model determine the actual distribution shape and are determined from a parameter learning algorithm, such as an Expectation-Maximization algorithm.

In some embodiments, the probabilistic graphical model is further refined by supervised learning using expert knowledge sources 160 to match appliance conditions with known variable data values or value-change ranges. The probabilistic graphical model, which is a type of statistical model that represents a set of variables and their conditional dependencies via a directed acyclic graph (DAG). Bayesian networks are ideal for taking an event that occurred and predicting the likelihood that any of several possible known causes was the contributing factor. For example, a Bayesian network could represent the probabilistic relationships between diseases and symptoms. Given symptoms, the network can be used to compute the probabilities of the presence of various developing conditions, errors, and malfunctions.

Diagnostic program 300 generates a probabilistic response to a received query. For example, for an appliance (A) having a current set of sensor readings (S), and having received a natural language query (Q) submitted by a user, diagnostic program 300 creates a set of observations (O) from the set of sensor readings (S) such that each element in S corresponds to a variable (Vi) in the Bayesian network model and $v_i$ is the value of the variable read from S. The query is mapped into a logical probability expression by use of a NN model. For example, the query may map to a conditional probability: $P(X|Y1, Y2 ... Yk)$, where X, Y1, Y2 ... Yk correspond to the variables Vi. The variables are mapped to the observations from the sensor readings (S) and observations (O) (i.e., appliance events) that correspond to the query (Q). Diagnostic program 300 generates a conditional probability and executes the conditional probability over the DNB model using, for instance, a variable elimination inference algorithm.

Appliance 120 is an electro-mechanical smart device performing an operational activity or service. A type of appliance includes a plurality of appliances that in general perform a particular function or activity. In some embodiments, appliance 120 may be a type of domestic appliance, such as, but not limited to, a washing machine, a dryer, a dishwasher, an oven/stove, a freezer, a microwave oven, a furnace, a hot water heater, or an air conditioner. In some embodiments, appliance 120 may be an industrial-grade counterpart of a domestic appliance, and may also include an elevator, or an escalator. In other embodiments, appliance 120 may be an electronic device, such as a modem, a router, a switch, or a hub device. Appliance 120 includes components enabling connectivity to the Internet via network 150, and sensor components enabling the monitoring, collection, and transmission of sensor data of the interaction of components and subsystems of appliance 120 operation to diagnostic program 300 operating on computing device 110 via network 150.

For example, appliance 120 may include sensors to detect vibration, sound, temperature, revolutions of rotating parts, current draw, and hours of operation. Sensor data from appliance 120 is transmitted via network 150 to computing device 110 and received by diagnostic program 300 operating a diagnostic model generated from machine learning techniques applied to data from historical logs 130 and expert knowledge source 140. In some embodiments, the sensor data from appliance 120 is also continuously received by historical logs 130 and used to adjust and improve the generated model of diagnostic program 300.

Historical logs 130 is a collection of data from multiple appliances 160 that includes data from different classes, or types of appliances, and different makes (i.e., manufacturers) and models of appliances. Historical logs 130 includes sensor data, operational modes and status, component status, error codes, and other information associated with the operation of appliances, such as multiple appliances 160 and appliance 120. Historical logs 130 includes a time horizon associated with the respective collected data providing duration and timing elements to the sensor, status, error message, and monitoring data.

Expert knowledge source 140 includes known technical and empirical data associated with the class, make, and model of the respective appliance. In some embodiments, expert knowledge source 140 includes input from technical manuals, engineering updates, and information of designed interaction between subsystems and components of the respective appliance. In some embodiments of the present invention, expert user input is included as a source of expert knowledge, and expert users may assess and update the diagnostic probabilistic graphical model during development to improve accuracy and effectiveness.

Multiple appliances 160 represents a plurality of appliances that are connected to historical log 130. Multiple appliances 160 includes multiple instances of appliances of different classes, makes, and models that are configured to connect with network 150 and transmit sensor and operational data, and information identifying the appliance, to historical logs 130. In some embodiments, historical logs 130 includes data logs of appliances such as, but not limited to, a washing machine, a dryer, a dishwasher, an oven/stove, a freezer, a microwave oven, a furnace, a hot water heater, an air conditioner, an industrial-grade counterpart of domestic appliances, and may also include elevators, or escalators.

Query engine 170 interfaces with query app 117 to translate audio or text-based queries associated with a status condition, error message, or malfunction of an appliance, such as appliance 120. In some embodiments, query engine 170 is a module component of diagnostic program 300 (not shown). In other embodiments, query engine 170 is communicatively connected to diagnostic program 300 and operates as a separate entity or service. Query engine 170 receives a query as input from query app 117 and using natural language processing (NLP) enabled by semantic analysis of parsed elements of the query, query engine 170 determines the subject matter, semantics, and sentiment of the query and provides output to diagnostic program 300 to obtain a corresponding response from the graphical probabilistic model. In some embodiments, query engine 170 receives a corresponding response from diagnostic program 300 and constructs an audio or text-based message including the corresponding response to query app 117 which is presented to a user from user interface 115 of computing device 110.

Figure 2A:
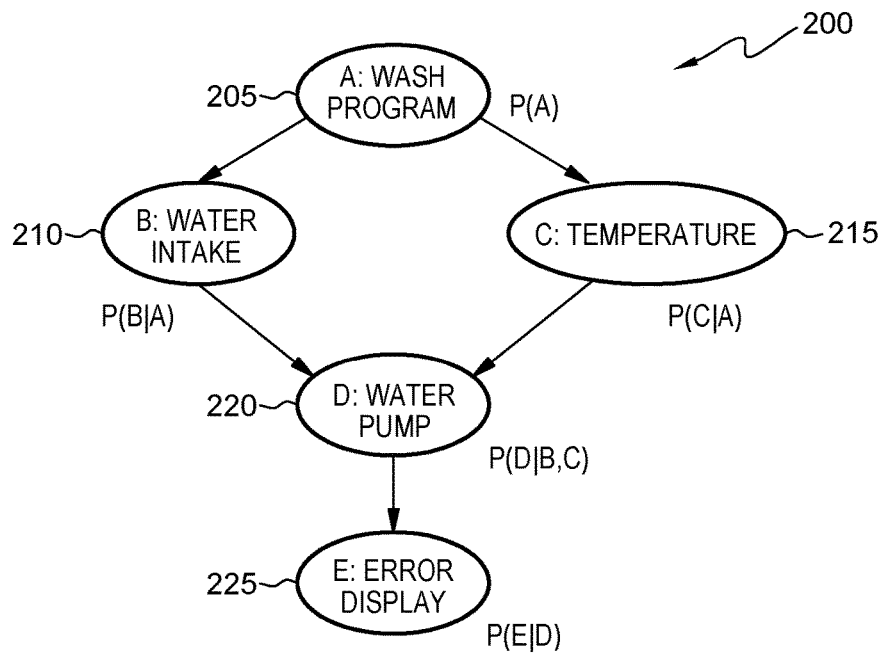
FIG. 2A depicts an example of a Bayesian network, illustrating interactions and dependencies between components of an appliance, in accordance with an embodiment of the present invention.

FIG. 2A. depicts an exemplary Bayesian network 200, illustrating interactions and dependencies between components of an appliance, which in the example is a washing machine. The Bayesian network includes variables for program cycle 205 (A: Wash program), water intake 210 (B), water temperature 215 (C), water pump operation 220 (D), and error code display 225 (E). The arrows displayed in FIG. 2A indicate the interaction between the variables of the appliance based on a factorization of the joint probability of all random variables, with the joint distribution factoring into a product of conditional distributions. Each node is associated with a conditional probability distribution in which the probability of a particular event is conditional based on the parent nodes. An appliance event may include conditions observed (noise/sound, odor, vibration, lack of function (motor), an error code or message displayed, and malfunctions.

For example, the probability of a water pump malfunction expressed as "P(D|B, C)", is the conditional probability that the water pump malfunctions given the water intake variable and the water temperature variable values. Probability parameters can be learned from the data, as well as the structure of the Bayesian network, as illustrated by the arrows in FIG. 2A.

FIG. 2A shows the probability of an event of water intake 210 (B) given a value of program cycle 205 (A), expressed as: "P(B|A)"; the probability of an event associated with water temperature 215 (C) given a value of program cycle 205 (A), expressed as: "P(C|A)"; the probability of an event associated with water pump operation 220 given values of the variables water intake 210 (B) and water temperature (C), expressed as: "P(D|B, C)"; and the probability of an event associated with error code display 225 (E) given a value of the variable water pump operation 220 (D) is expressed as: "P(E|D)".

Figure 2B:
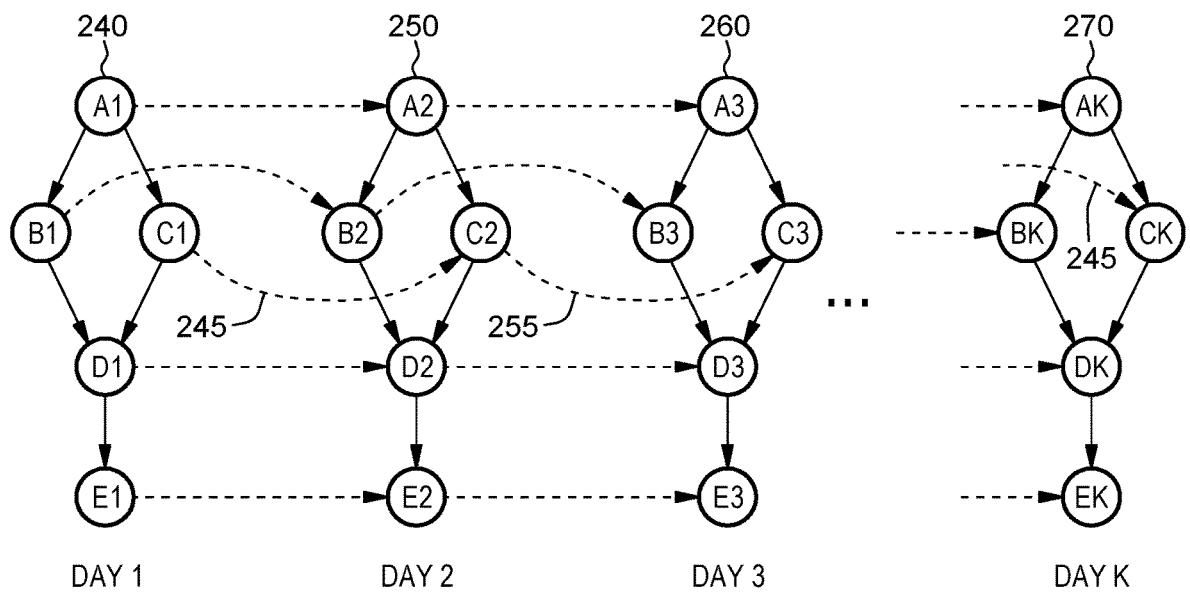
FIG. 2B depicts an unfolding of the Bayesian network of FIG. 2A over a time period, in accordance with an embodiment of the present invention.

FIG. 2B depicts an unfolding of a Bayesian network over time. The nodes of FIG. 2B correspond to variables associated with the operation of an appliance, and each variable receives a value associated with sensor data collected from the appliance. The appliance sensor data values, represented as variables in the model over a time horizon, enable the inclusion of temporal dependencies and relationships, which are also learned from the collected data. FIG. 2B includes Day 1 set of variables 240, day 2 set of variables 250, day 3 set of variables 260, and day k set of variables 270. Each day's set of appliance data includes variables A, B, C, D, and E, with the solid arrows indicating the conditional and dependent relationship between variables at a given point in time, and the dotted lines indicating the temporal relationships between similar type variables from one point in time to the next point in time.

For example, day 2 set of variables 250 includes variables at nodes A2, B2, C2, D2, and E2. A probability of an event at node C2 can be expressed as the probability of C2, given A2, and C1 [P C2|(A2, C1)]. Node C2 has a conditional relationship with A2 and a temporal relationship with C1 of day 1 set of variables 240. The probability of an event of node D2 of day 2 set of variables 250 would be expressed as the probability of D2, given B2, C2, and D1, [P D2|(C2, B2, D1)]. Day k set of variables 270 represents the relationship of variable nodes at some point in time "k", and each variable is depicted as having a temporal relationship with a previous time period of the respective variable.

Figure 3:
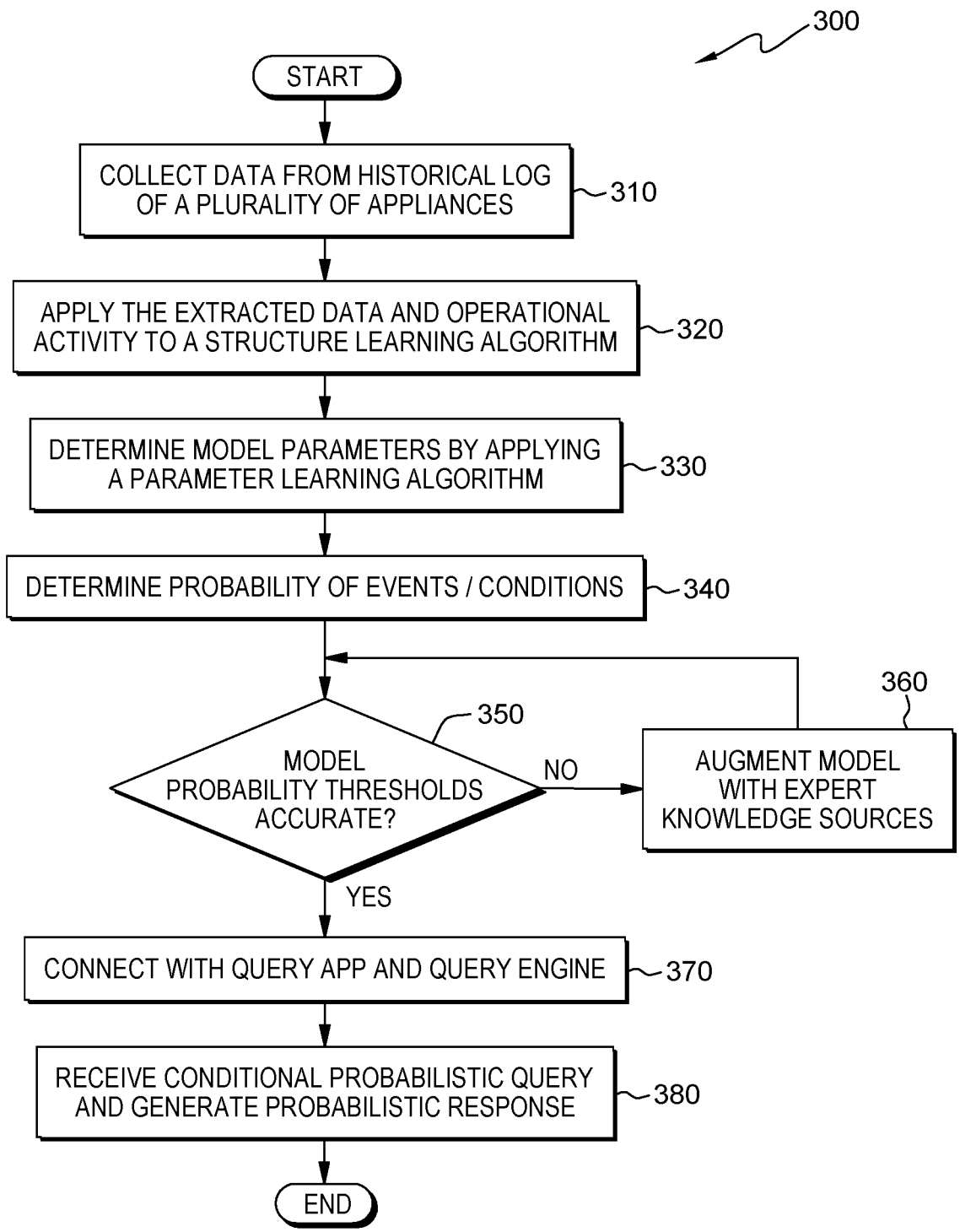
FIG. 3 is a flowchart depicting operational steps of a diagnostic program, operating in the distributed data processing environment of FIG. 1, in accordance with embodiments of the present invention.

FIG. 3 is a flowchart depicting the operational steps of one embodiment of diagnostic program 300. Diagnostic program 300 collects data from historical logs of a plurality of appliances (step 310). The collected historical log data includes sensor data, appliance mode, and operational data, as well as warning and error or malfunction conditions. The collected historical log data types vary by the type, and in some cases, vary by the model of the appliance. The collection of historical log data includes a time horizon associated with the recorded sensor and appliance activity data, providing both conditional and temporal relationships as well as time-dependent conditions and observations. In some embodiments, diagnostic program 300 sorts historical log data based on the type or class of appliance (e.g., washing machine), and may further sort the data based on the make and/or model of the appliance.

For example, diagnostic program 300 collects historical log data that includes sensor data, operational mode, or activity of the appliance, error codes, and warnings, as a function of a timeline. Diagnostic program 300 includes a large plurality of each class of appliance and sorts the data by the type or class of the appliance.

Diagnostic program 300 applies extracted sensor data and operational activity to a structure learning algorithm (step 320). Diagnostic program 300 extracts the data from the historical logs of appliances and, in some embodiments, formats the data aligning sensor variable data as a column of a table, and the time of logging the data as a row of the table. Diagnostic program 300 applies a structure learning algorithm to the extracted sensor and operational activity data to learn the structure of a dynamic Bayesian network model from the extracted data. One such structure learning algorithm, for example, is a Branch and Bond search algorithm combined with independence tests, suggested by Koller & Friedman; *Probabilistic Graphical Models: Principles and Techniques,* 2009.

For example, diagnostic program 300 applies a structure learning algorithm to the extracted and sorted data from the historical logs (i.e., historical logs 130), of the plurality of appliances. The structural learning algorithm determines the interrelationships and dependencies between the variables of the extracted data and observation data. From the determined interrelationships of the variables, diagnostic program 300, executing the structural learning algorithm, determines the graphical structure of the probabilistic model.

Diagnostic program 300 determines the model parameters by applying a parameter learning algorithm (step 330). Diagnostic program 300 employs a parameter learning algorithm, for example, an expectation-maximization (EM) algorithm, which is an iterative method to find a maximum likelihood or maximum posteriori estimate of parameters. The algorithm iterations alternate between performing an expectation step and a maximization step. The parameter estimates are used to determine the distribution of the variables in the next estimation step of the iteration.

Diagnostic program 300 determines the probability of events and conditions (step 340). Diagnostic program 300 determines the probability value of events and/or conditions of appliances based on machine learning technique training of the model and based on the collection of historical log data. In some embodiments, events of the appliance include, but are not limited to, malfunction of components of the appliance or malfunction in an operation cycle of the appliance. In some embodiments, conditions of the appliance include, but are not limited to, deviation from set parameters of the appliance and component state leading to a temporal prediction of malfunction, based on sensor data. Diagnostic program 300 determines a probability value given a set of sensors and time-based data of the appliance.

For example, diagnostic program 300 determines a probability of a water pump of a washing machine appliance (of a particular make/model) malfunctioning given sensor data of water flow, water pump RPMs (revolutions per minute), vibration level changes over time, and audible level changes of the water pump over time. Diagnostic program 300 determines a probability of malfunction for the water pump, which varies as the set of sensor data changes, and as the sensor data progresses in a direction associated with a pending malfunction of the water pump, the probability value of a water pump malfunction event increases.

Diagnostic program 300 determines whether model probability thresholds for events and conditions are accurate (decision step 350). Having determined probability values for combinations of sensor data values and timelines, diagnostic program 300 determines threshold probability values for events and conditions, based on the collected historical log data and applies combinations of sensor data input to the model and determines whether the model thresholds accurately indicate the respective event or condition.

For the case in which diagnostic program 300 determines that the current probability threshold fails to accurately correspond to the event or condition of the appliance (step 350, "NO" branch), diagnostic program 300 proceeds to augment the dynamic probabilistic graphical model with expert knowledge sources (step 360). In some embodiments of the present invention, diagnostic program 300 accesses expert knowledge sources from technical reports and manuals associated with the appliance and modifies the model and/or the probability threshold value for the respective event or condition to improve the accuracy of the model. In some embodiments, the expert knowledge source may be an expert user that provides input and may adjust the model by editing, adding, or deleting nodes, dependencies, and parameters. Diagnostic program 300 implements the adjustments to the model and returns to decision step 350 and proceeds as described above.

For the case in which diagnostic program 300 determines that the current probability thresholds accurately correspond to the event or condition of the appliance (step 350, "YES" branch), diagnostic program 300 proceeds to connect with query app 117 and query engine 170 to provide query and response capability for appliance diagnostics (step 370). In some embodiments of the present invention, query app 117 and query engine 170 enable conversational diagnostic query capability for an appliance.

Diagnostic program 300, receives a conditional probabilistic query and generates a probabilistic response from the graphical model (step 380). Query app 117 receives a text-based or audible query from a user and, in conjunction with query engine 170, the received query is transformed, using natural language processing, into a proper conditional probabilistic query statement of an event or condition. Diagnostic program 300 receives the conditional probabilistic formatted query statement and applies the query statement to the model (dynamic Bayesian network—DBN) using a standard inference algorithm, such as variable elimination. Diagnostic program 300 generates a probabilistic response from the graphical model, applying the probability value obtained from applying the query to the probabilistic graphical model and determining whether the probability value exceeds a determined threshold for the event or condition of the query. Diagnostic program 300 provides an affirmative or negative response to the query, based on whether the probability value obtained from the probabilistic graphical model exceeds the threshold.

In some embodiments of the present invention, diagnostic program 300 returns the response to query engine 170 in a proper probability response format, and query engine 170 transforms the probability response format to a text-based or audible response and sends the response to user interface 115 of computing device 110. The user submitting the query receives a response from diagnostic program 300 via user interface 115.

Having provided the probabilistic graphical model response, diagnostic program 300 ends.

Figure 4:
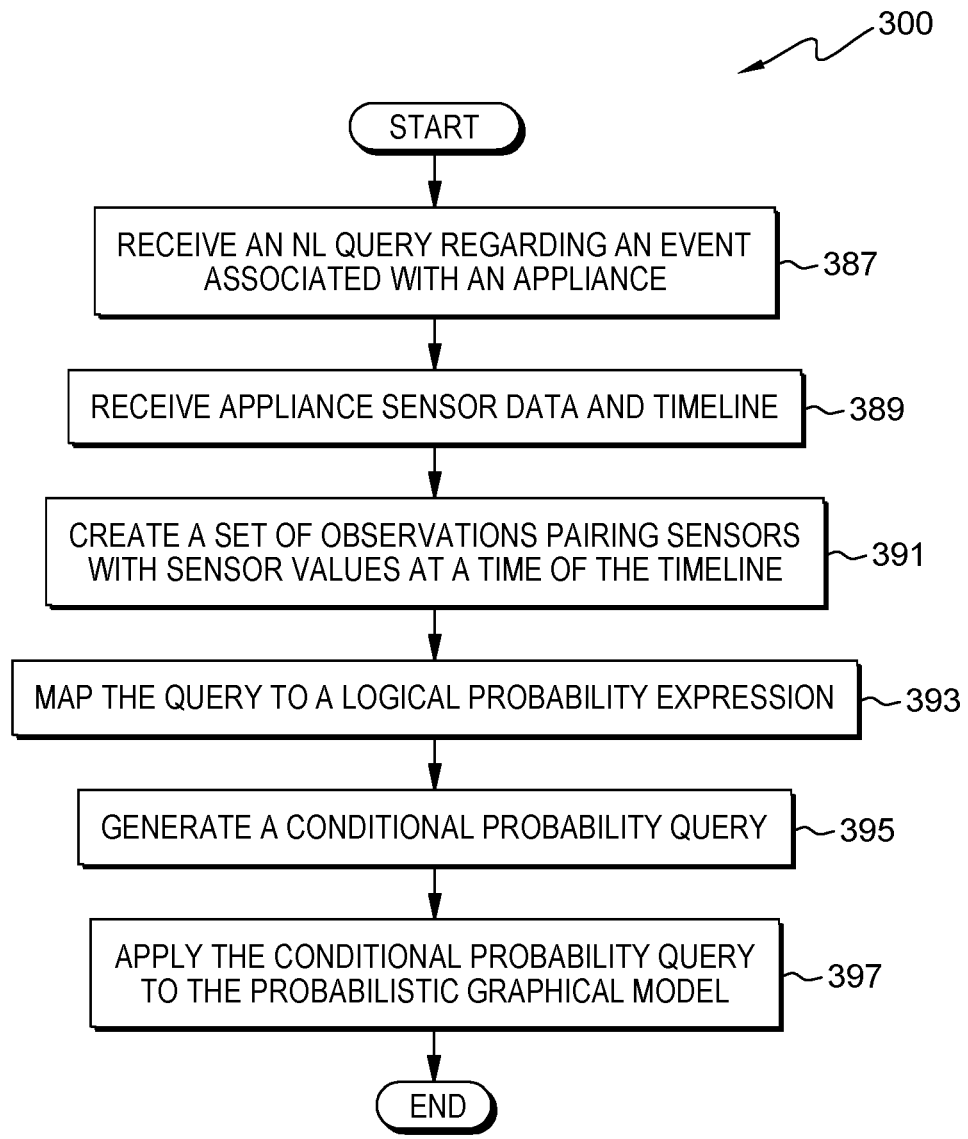
FIG. 4 is a flowchart of a query engine translating a natural language query to a proper probabilistic query as a module of the diagnostic program, in accordance with embodiments of the present invention.

FIG. 4 is a flowchart of query engine 170 translating a natural language query to a proper probabilistic query as a module of diagnostic program 300. Diagnostic program 300 receives a natural language query regarding an event associated with an appliance (step 387). The received query is in a format that utilizes natural language, such as an audible query spoken by a user to user interface 115 of computing device 110. In some embodiments, the natural language query is received as text, such as text entered from a keyboard or SMS text. The natural language query includes an event associated with the appliance, such as a query directed to a component of the appliance, a condition of a component, program, subsystem or state of the appliance.

Diagnostic program 300 receives appliance sensor data and timeline information (step 389). Having received the natural language query, diagnostic program 300 receives the sensor data from the appliance for a particular time of the timeline of the appliance. In some embodiments, the sensor data received corresponds to the current sensor data at the time of the receipt of the query. In other embodiments in which the query may include a temporal element of an event, diagnostic program 300 may access and receive sensor data corresponding to the temporal range of the event referenced in the query.

Diagnostic program 300 creates a set of observations pairing sensors with sensor values at a time of the timeline (step 391). Diagnostic program 300 creates an observation as a pairing of a variable corresponding to a sensor of the appliance with the value received from the sensor at a particular time of the timeline. Diagnostic program 300 creates observations for the respective variables of the appliance. The set of observations includes pairings for respective variables and values of the variables as received from the sensors of the appliance at a point in time of the timeline. In some embodiments, the point in time of the timeline corresponds to the time of the receipt of the query. In other embodiments, the point in time of the timeline may correspond to and averaging of sensor values within a range of time.

Diagnostic program 300 maps the query to a logical probability expression (step 393). Diagnostic program 300, operating through query engine 170 as a module of diagnostic program 300, parses the natural language query and maps the parsed elements of the query to a logical expression in the form of "the probability of an event (X) given the values of the variables of the appliance" $[P(X)|Y_1, Y_2, \ldots Y_k)]$, in which X is the subject of the query and $Y_1, Y_2, \ldots Y_k$ are sensor values paired with variables of the appliance at time T of the timeline. In some embodiments, a neural network model is used to perform the mapping of the natural language query into a proper conditional probability expression, such as using a sequence to sequence (seq2seq) model trained on pairings of text and logical format.

Diagnostic program 300 generates a conditional probability query (step 395). Having mapped the query elements to logical expressions, diagnostic program 300 forms the conditional probability form of the query. Diagnostic program 300 can form the conditional probability query by mapping the variables to the observations determined from the natural language query.

Diagnostic program 300 applies the conditional probability query to the probabilistic graphical model (step 397). In example embodiments, diagnostic program 300 applies the query, transformed into a proper conditional probability format, to the probabilistic graphical model using a standard inference algorithm, such as a variable elimination algorithm. Diagnostic program 300 determines a probability of the queried event by aligning the observations of the query to the observations associated with nodes of the probabilistic graphical model. If the probability of the event exceeds a pre-determined threshold, then diagnostic program 300 indicates a positive likelihood of the event occurring in a response to the query.

In some embodiments of the present invention, diagnostic program 300 translates a response (not shown) to the natural language query from a logical probability expression to a natural language response by reversing the process as described above. In some embodiments, diagnostic program 300 can provide the response as a text message or text display, such as displaying the text on user interface 115 of computing device 110. In other embodiments, diagnostic program 300 can provide the response to the natural language query in machine-generated audio, providing a natural language response to the query. Having provided a response to the natural language query, diagnostic program 300 ends.

Figure 5:
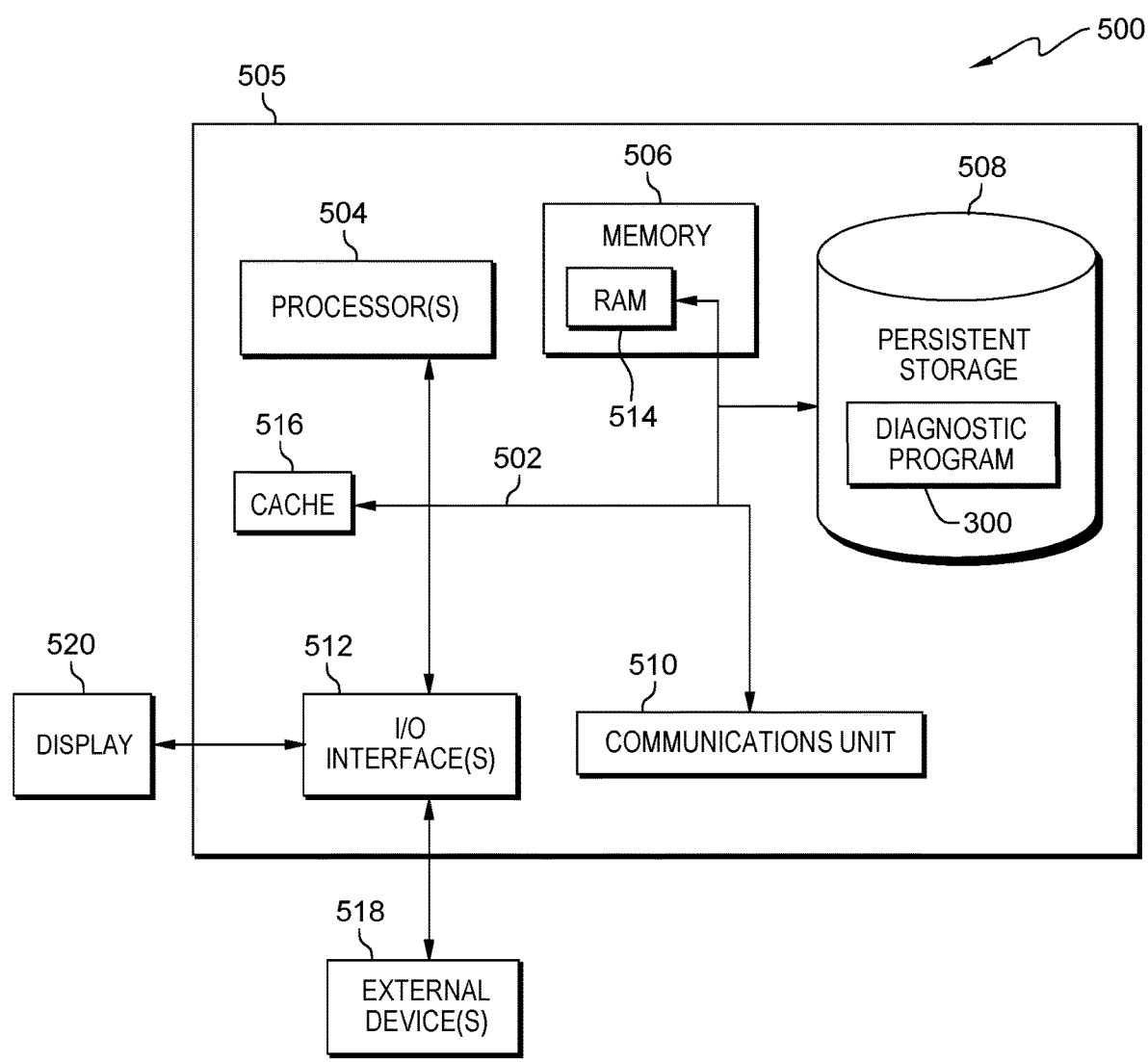
FIG. 5 depicts a block diagram of components of a computing system, including a computing device configured to operationally perform the diagnostic program of FIGS. 3 and 4, in accordance with an embodiment of the present invention.

FIG. 5 depicts a block diagram of components of computing system 500, including computing device 505, configured to include or operationally connect to components depicted in FIG. 1, and with the capability to operationally perform diagnostic program 300 of FIG. 3, in accordance with an embodiment of the present invention.

Computing device 505 includes components and functional capability similar to components of computing device 110 (FIG. 1), in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

Computing device 505 includes communications fabric 502, which provides communications between computer processor(s) 504, memory 506, persistent storage 508, communications unit 510, an input/output (I/O) interface(s) 512. Communications fabric 502 can be implemented with any architecture designed for passing data and/or control information between processors (such as microprocessors, communications, and network processors, etc.), system memory, peripheral devices, and any other hardware components within a system. For example, communications fabric 502 can be implemented with one or more buses.

Memory 506, cache memory 516, and persistent storage 508 are computer-readable storage media. In this embodiment, memory 506 includes random access memory (RAM) 514. In general, memory 506 can include any suitable volatile or non-volatile computer-readable storage media.

In one embodiment, diagnostic program 300 is stored in persistent storage 508 for execution by one or more of the respective computer processors 504 via one or more memories of memory 506. In this embodiment, persistent storage 508 includes a magnetic hard disk drive. Alternatively, or in addition to a magnetic hard disk drive, persistent storage 508 can include a solid-state hard drive, a semiconductor storage device, read-only memory (ROM), erasable programmable read-only memory (EPROM), flash memory, or any other computer-readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer-readable storage medium that is also part of persistent storage 508.

Communications unit 510, in these examples, provides for communications with other data processing systems or devices, including resources of distributed data processing environment 100. In these examples, communications unit 510 includes one or more network interface cards. Communications unit 510 may provide communications through the use of either or both physical and wireless communications links. Diagnostic program 300 may be downloaded to persistent storage 508 through communications unit 510.

I/O interface(s) 512 allows for input and output of data with other devices that may be connected to computing system 500. For example, I/O interface 512 may provide a connection to external devices 518 such as a keyboard, keypad, a touch screen, and/or some other suitable input device. External devices 518 can also include portable computer-readable storage media such as, for example, thumb drives, portable optical or magnetic disks, and memory cards. Software and data used to practice embodiments of the present invention, e.g., diagnostic program 300 can be stored on such portable computer-readable storage media and can be loaded onto persistent storage 508 via I/O interface(s) 512. I/O interface(s) 512 also connects to a display 520.

Display 520 provides a mechanism to display data to a user and may, for example, be a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network, and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, configuration data for integrated circuitry, or either source code or object code written in any combination of one or more programming languages, including an object-oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer-readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus, or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for automated diagnostics of appliances, the method comprising:
   collecting, respectively, by one or more processors, from a plurality of a type of network-connected appliances, a historical log of sensor data, appliance-observations, and events associated with the type of network-connected appliances recorded over a timeline;
   generating, by one or more processors, a dynamic probabilistic graphical model of the events of the type of network-connected appliances, wherein generating the dynamic probabilistic graphical model further comprises:
      mapping, by one or more processors, data of a sensor of a plurality of sensors monitoring operational activity of the type of network-connected appliances to a variable of a plurality of variables, respectively;
      mapping, by one or more processors, an event associated with an appliance of the type of network-connected appliances, within the timeline, to a set of variables and corresponding sensor values of the set of variables associated with the timeline;
      applying, by one or more processors, a structure learning algorithm to the set of variables and the timeline, wherein probability parameters of the dynamic probabilistic graphical model of the events associated with the type of network-connected appliances are determined based on applying an expectation-maximization algorithm; and
      applying, by one or more processors, expert knowledge of an interaction between one or more subsystems and components of the type of network-connected appliances, respectively, as supervised machine learning techniques; and responsive to receiving a diagnostic query regarding a diagnosis of the type of network-connected appliances, generating, by one or more processors, a response of a probability value of the event associated with the appliance of the type of network-connected appliances, based on the diagnosis from the dynamic probabilistic graphical model.

2. The method of claim 1, further comprising:

providing, by one or more processors, a natural language processing (NLP) conversational user interface for diagnostic queries regarding the operational activity of the type of network-connected appliance.

3. The method of claim 1, wherein the appliance of the type of network-connected appliances performs a same operational activity.

4. The method of claim 1, wherein the event of the type of network-connected appliances, respectively, includes one or more selected from a group consisting of: malfunction of the appliance, a state of condition of the appliance, a condition of a component of the appliance, a condition of a subsystem of the appliance, and an estimated prediction of a malfunction at a future time.

5. The method of claim 1, further comprising:

training, by one or more processors, the dynamic probabilistic graphical model by applying machine learning techniques to the historical log of operational activity collected from the plurality of the type of network-connected appliances.

6. The method of claim 1, wherein mapping of the data of a sensor of the plurality of sensors monitoring operational activity of the type of network-connected appliances to a variable of the plurality of variables, respectively, includes associating a time reference of the data of the sensor from the timeline.

7. The method of claim 1, wherein the type of network-connected appliance includes a particular manufacturer of the appliance.

8. A method for applying a natural language query to a probabilistic graphical model, the method comprising:

receiving, by one or more processors, a natural language query regarding an event of an appliance;

receiving, by one or more processors, sensor data from the appliance including a timeline associated with the sensor data;

creating, by one or more processors, a set of observations in which an observation pairs a variable of the appliance with a value from a corresponding sensor of the sensor data from the appliance, wherein variables of the set of observations correspond to respective variables in a probabilistic graphical model, and the respective variables of the probabilistic graphical model include respective values;

mapping, by one or more processors, the natural language query regarding the event of the appliance to a logical expression of the probability of the event of the appliance included in the natural language query, given the value of the respective variables of the set of observations associated with the natural language query;

generating, by one or more processors, a conditional probability query by mapping the respective variables to the set of observations included in the natural language query; and applying, by one or more processors, the conditional probability query to the probabilistic graphical model using an inference algorithm.

9. The method of claim 8, further comprising:

determining, by one or more processors, whether the probability of the event of the appliance exceeds a pre-determined threshold; and responsive to the probability of the event of the appliance exceeding the pre-determined threshold, returning, by one or more processors, a response indicating a positive likelihood of the event.

10. The method of claim 9, wherein the positive likelihood of the event of the appliance is expressed as a probability of the event of the appliance occurring within a designated time frame.

11. The method of claim 8, wherein a neural network model maps natural language terms of the natural language query of components and a state of the appliance to a conditional probability expression.

12. The method of claim 8, further comprising:

receiving, by one or more processor, a natural language query regarding a prediction of an event of an appliance;

applying, by one or more processor, a dynamic Bayesian network (DBN) inference algorithm in which a transition function depends only on an immediately preceding time slice of the timeline of sensor data; and predicting, by one or more processors, a response to the conditional probability query, based on the inference algorithm.

13. The method of claim 12, wherein the inference algorithm is a variable elimination algorithm.

14. A computer system for automated diagnostics of appliances, computer system comprising:

one or more computer processors;

one or more computer-readable storage media, and program instructions stored on the one or more computer-readable storage media, the program instructions comprising:

program instructions to collect, respectively, from a plurality of a type of network-connected appliances, a historical log of sensor data and events associated with the type of network-connected appliances recorded over a timeline;

program instructions to generate a dynamic probabilistic graphical model of the events of the type of network-connected appliances, wherein program instructions to generate the dynamic probabilistic graphical model further comprises:

program instructions to map data of a sensor of a plurality of sensors monitoring operational activity of the type of network-connected appliances to a variable of a plurality of variables, respectively;

program instructions to map an event associated with an appliance of the type of network-connected appliances, within the timeline, to a set of variables and corresponding sensor values of the set of variables associated with the timeline;

program instructions to apply a structure learning algorithm to the set of variables and the timeline, wherein probability parameters of the dynamic probabilistic graphical model of the events associated with the type of network-connected appliances are determined based on program instructions to apply an expectation-maximization algorithm; and program instructions to apply expert knowledge of an interaction between one or more subsystems and components of the type of network-connected appliances, respectively, as supervised machine learning techniques; and responsive to receiving a diagnostic query regarding a diagnosis of the type of network-connected appliances, program instructions to generate a response of a probability value of the event associated with the appliance of the type of network-connected appliances, based on the diagnosis from the dynamic probabilistic graphical model.

15. The computer system of claim 14, further comprising:
program instructions to provide a natural language processing (NLP) conversational user interface for diagnostic queries regarding the operational activity of the appliance.

16. The computer system of claim 14, wherein the type of network-connected appliances performs a same operational activity.

17. The computer system of claim 14, wherein the event of the type of network-connected appliances, respectively, includes one or more selected from a group consisting of: malfunction of the appliance, a state of condition of the appliance, a condition of a component of the appliance, a condition of a subsystem of the appliance, and an estimated prediction of a malfunction at a future time.

18. The computer system of claim 14, further comprising:
program instructions to train the dynamic probabilistic graphical model by applying machine learning techniques to the historical log of operational activity collected from the plurality of the type of network-connected appliances.

19. The computer system of claim 14, wherein the program instructions to map the data of a sensor of the plurality of sensors monitoring the operational activity of the type of network-connected appliances to a variable of the plurality of variables, respectively, includes associating a time reference of the data of the sensor from the timeline.

20. The computer system of claim 14, wherein the type of network-connected appliance includes a particular manufacturer of the appliance.

* * * * *